United States Patent
Shiratsuchi

(10) Patent No.: US 9,550,295 B2
(45) Date of Patent: Jan. 24, 2017

(54) INTERFERENCE CHECK DEVICE

(71) Applicant: Mitsubishi Electric Corporation, Chiyoda-ku (JP)

(72) Inventor: Koji Shiratsuchi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/651,426

(22) PCT Filed: Jan. 22, 2014

(86) PCT No.: PCT/JP2014/051283
§ 371 (c)(1),
(2) Date: Jun. 11, 2015

(87) PCT Pub. No.: WO2014/122995
PCT Pub. Date: Aug. 14, 2014

(65) Prior Publication Data
US 2015/0328776 A1    Nov. 19, 2015

(30) Foreign Application Priority Data

Feb. 6, 2013  (JP) ................. 2013-021515

(51) Int. Cl.

| G05B 19/04 | (2006.01) |
|---|---|
| G05B 19/08 | (2006.01) |
| B25J 9/16 | (2006.01) |
| G05B 17/02 | (2006.01) |

(Continued)

(52) U.S. Cl.
CPC ............ B25J 9/1676 (2013.01); B25J 9/1666 (2013.01); G05B 17/02 (2013.01);
(Continued)

(58) Field of Classification Search
CPC ........... B25J 9/1676; B25J 9/1666; B25J 9/16; G05B 17/02; G05B 2219/39094; G05B 19/04; G05B 19/18; G05B 19/418; G05B 2219/39135; G05B 2219/40442; G05B 2219/40477; G05B 2219/40492; Y10S 901/02; Y10S 901/49
See application file for complete search history.

(56) References Cited

U.S. PATENT DOCUMENTS 5,347,459 A * 9/1994 Greenspan ............. B25J 9/1666
345/424
5,561,742 A * 10/1996 Terada ................... B25J 9/1669
700/249

(Continued)

FOREIGN PATENT DOCUMENTS

| JP | 64-026981 A | 1/1989 |
|---|---|---|
| JP | 04-236676 A | 8/1992 |

(Continued)

OTHER PUBLICATIONS

International Search Report issued Apr. 28, 2014, in PCT/JP2014/051283, filed Jan. 22, 2014.

*Primary Examiner* — Jerrah Edwards
*Assistant Examiner* — Rachid Bendidi
(74) *Attorney, Agent, or Firm* — Oblon, McClelland, Maier & Neustadt, L.L.P.

(57) ABSTRACT

An interference check device includes a model-number upper-limit input unit to which a model upper-limit number of geometric models allocated to a modeling target of interference check is input, a modeling unit generating model candidates from the modeling target using geometric models equal to or less than the model upper limit number, a processing-computation-amount upper-limit setting unit setting a computation upper-limit amount of interference check based on a computation processing amount required for each process performed by a controller controlling the modeling target, a minimum-enclosure-volume-model determination unit determining a model candidate having smallest model enclosure volume as a model for the modeling target from the model candidates that can perform
(Continued)

calculation processing of interference check with equal to or less than the computation upper-limit amount, and an interference check unit performing interference check between models using determined model.

10 Claims, 11 Drawing Sheets

(52) U.S. Cl.
CPC ... *G05B 2219/39094* (2013.01); *Y10S 901/02* (2013.01); *Y10S 901/49* (2013.01)

(56) References Cited

U.S. PATENT DOCUMENTS 8,315,738 B2 * 11/2012 Chang .................... B25J 9/1666
 700/248

2003/0225479 A1 * 12/2003 Waled ..................... B25J 9/161
 700/245
2007/0150093 A1 * 6/2007 Nagatsuka ............. B25J 9/1682
 700/235
2012/0215351 A1 * 8/2012 McGee ................. B25J 9/1666
 700/248

FOREIGN PATENT DOCUMENTS

| JP | 06-238581 A | 8/1994 |
|---|---|---|
| JP | 11-254379 A | 9/1999 |
| JP | 2001-315087 A | 11/2001 |
| JP | 2003-271687 A | 9/2003 |
| JP | 3612781 B2 | 1/2005 |
| JP | 2010-52114 A | 3/2010 |
| JP | 2012-216151 A | 11/2012 |
| JP | 2013-129018 A | 7/2013 |
| JP | 5275967 B2 | 8/2013 |

* cited by examiner

FIG.3
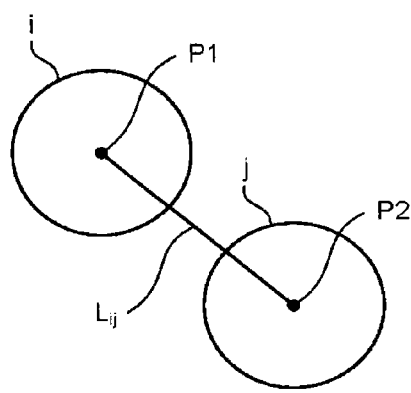
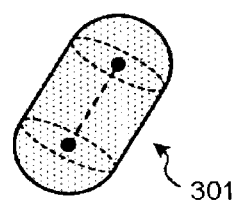
FIG. 4A
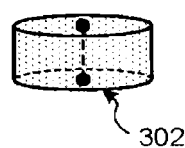
FIG. 4B
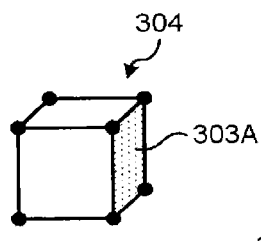
FIG. 4C
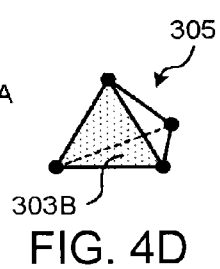
FIG. 4D
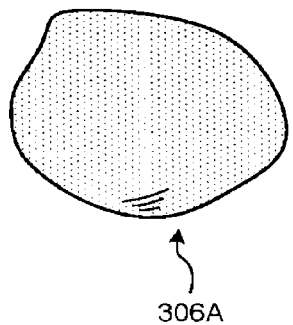
FIG. 4E
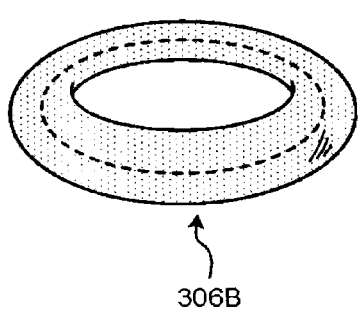
FIG. 4F

INTERFERENCE CHECK DEVICE

FIELD

The present invention relates to an interference check device that checks interference between robots or between a robot and peripheral devices.

BACKGROUND

An interference check device is a device that checks for the possibility of collisions between an industrial robot and peripheral devices thereof in order to prevent occurrence of collisions. By checking for the possibility of a collision, if there is a possibility of a collision, the interference check device outputs an appropriate command value (a command value for stopping a robot or correcting the motion trajectory thereof) to a robot or the like, thereby preventing occurrence of a collision. Particularly, in an interference check device that performs an online interference check even when a robot is in operation, the actual detailed shapes of the industrial robot and peripheral devices thereof are not used, but are replaced by models (for example, a spherical body or a cylindrical body) that enable easy and fast calculation processing of an interference check in order to perform an interference check between the models.

When replacing a modeling target (an object) such as a robot body with a model, the interference check device divides the modeling target into a plurality of regions in advance while taking into consideration the number of movable axes of joints (flexibility of a mechanism) or the like. The interference check device arranges the model such that each region is enclosed by a simple geometric model (such as a spherical body, a cylindrical body, a cuboid, or a polyhedron), referred to as a "primitive". Further, the interference check device calculates the shortest distance between the respective primitives and if the shortest distance becomes shorter than 0 or a predetermined distance set in advance, the interference check device determines that "interference will occur" and outputs a stop command to start a stop operation.

A specific model generation method for a modeling target is described here. Modeling requires that "a modeling target is enclosed in a state where a model is larger than the modeling target". Regarding enclosure of the target, if the target is enclosed within an excess space and the model setting is too large, it causes an erroneous determination that "interference has occurred", although there is no possibility of interference between the targets. Therefore, when modeling is performed, it is important to effectively enclose the entire target by using a model having a small excess space.

As a model used for an interference check, a method of using a spherical body having advantageous unit determination calculation cost has been used hitherto. Even when a determination between spherical bodies is performed, if the possibility of interference is determined for all the models being present, the calculation cost increases by as much as the combinations of the models. Accordingly, in order to increase the efficiency of calculation processing, a method of determining the possibility of interference not for all the models at all times but determining in detail only for a portion having a possibility of interference has been proposed.

According to this method, for example, a model having a large radius and roughly modeled by a small number of models and a model having a small radius and modeled in detail by a large number of models are prepared hierarchically with respect to a robot. By adopting a method of performing a determination of interference between rough models first, and if there is a possibility of interference, performing a determination of interference between detailed models, the calculation cost is reduced with high accuracy (for example, see Patent Literature 1).

In a field where an offline or online interference check of a robot or the like is required, it is desired to perform the interference check by using a model that is modeled accurately as described above.

CITATION LIST

Patent Literature

Patent Literature 1: Japanese Patent No. 3612781

SUMMARY

Technical Problem

However, in the conventional technique described above, although determinations of interference between all the models can be avoided, when the models are placed close to each other, the number of models requiring the determination increases. As a result, when detailed modeling is performed by using a spherical body having small calculation cost per unit, large calculation cost may be incurred.

Furthermore, when a single kind of primitive is applied to a model, by increasing the number of models from N to N+1, the excess volume when the target is enclosed may increase. In this case, although there is hardly any change in the excess enclosure of the model, the calculation cost for determinations may increase.

Therefore, in order to reduce an enclosure volume while realizing stable calculation cost at all times, not a single model but an enclosure model effective for the shape needs to be selected. When there is an upper limit to the calculation cost, it is necessary to consider whether the total calculation cost does not exceed the upper limit.

For example, by using a cylindrical body other than the spherical body as the enclosure model, an interference check time per model unit increases; however, the modeling target can be enclosed with fewer models than that of the spherical body. Therefore, it is desired to study effective model selection and arrangement as a whole. However, in practice, the user of a robot in which an interference check device is installed performs a work to add a model and it has been difficult to perform model arrangement by user adjustment while taking the above factors into consideration.

The present invention has been achieved in view of the above and an object of the present invention is to provide an interference check device that can easily generate a model with a minimum model enclosure volume within limited calculation cost.

Solution to Problem

In order to solve the above problems and achieve the object, an aspect of the present invention is an interference check device including: a model-number upper-limit input unit to which an upper limit number of geometric models that is allocated to a modeling target is input, the modeling target being a target of an interference check; a modeling unit that, when a cuboid that is capable of enclosing the modeling target is set as the modeling target as a model for an interference check, uses new geometric models that have a calculation cost per unit distance calculation smaller than the cuboid and that are in number equal to or less than the upper limit number of models to replace the cuboid with the new geometric models and models the modeling target; a model-candidate storage unit that stores, as model candidates, models in which the new geometric models are used; a computation-amount upper-limit setting unit that sets a computation upper-limit amount that is an upper limit of a computation amount in calculation processing of an interference check, on a basis of information relating to a computation processing amount required for each process performed by a controller that controls the modeling target; a volume-model determination unit that extracts, from the model candidates, a model candidate on which a calculation processing of the interference check is capable of being performed with a computation processing amount equal to or less than the computation upper-limit amount, and determines a model candidate having a smallest model enclosure volume as a model for the modeling target from among extracted model candidates; and an interference check unit that performs an interference check between models by using a model determined by the volume-model determination unit, and, if there is a possibility of interference, outputs an operation stop command, and, if there is no possibility of interference, outputs an operation continuation command.

Advantageous Effects of Invention

According to the present invention, an effect is obtained where it is possible to easily generate a model with a minimum model enclosure volume within limited calculation cost.

BRIEF DESCRIPTION OF DRAWINGS

FIG. 3 is an explanatory diagram of the calculation cost per unit distance calculation when a spherical model determination is performed.

FIGS. 4A-4F are diagrams illustrating other target examples of the unit distance calculation.

DESCRIPTION OF EMBODIMENTS

An interference check device according to embodiments of the present invention will be explained below in detail with reference to the accompanying drawings. The present invention is not limited to the embodiments.

First Embodiment.

Figure 1:
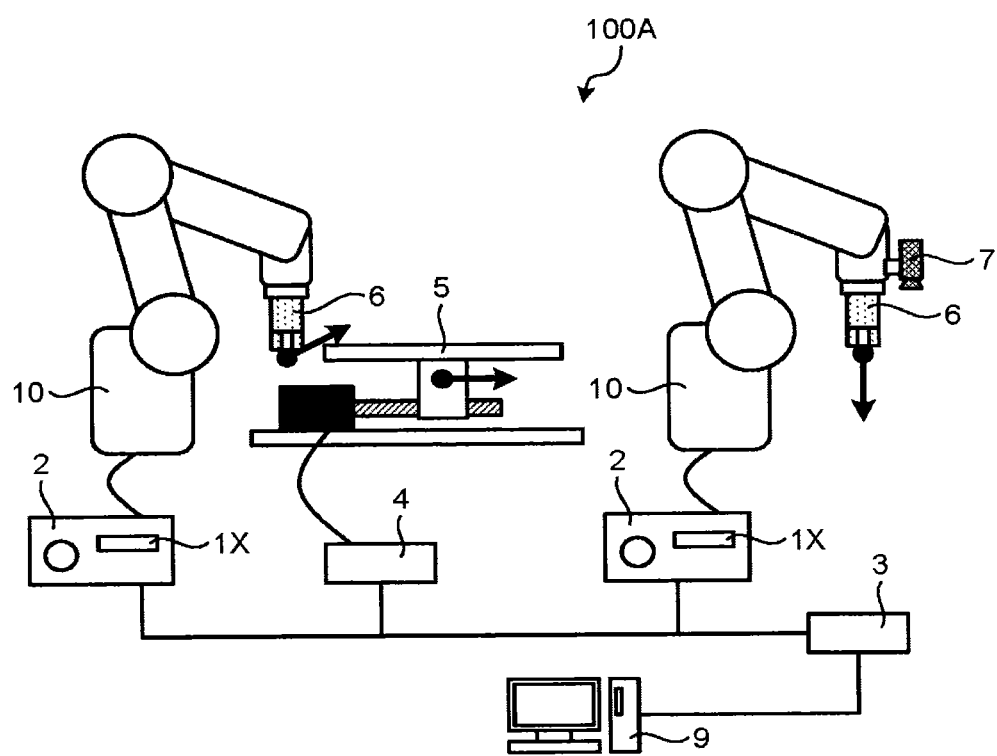
FIG. 1 is a diagram illustrating a configuration of an interference check system including an interference check device according to a first embodiment.

FIG. 1 is a diagram illustrating a configuration of an interference check system including an interference check device according to a first embodiment. An interference check system 100A is a system configured to include a robot production system, a communication device 3 that connects between devices of the robot production system, and a computer 9 that changes the settings of each controller provided in the robot production system. The interference check system 100A can include, instead of the communication device 3, a control device such as a PLC (Programmable Logic Controller) having a communication function and a function of transmitting command values and signals to each device.

The communication device 3 performs communication in the interference check system 100A by using the Ethernet® or the like. Specifically, the communication device 3 communicates with robot controllers 2, a peripheral device controller 4, and the computer 9.

The computer 9 is a device such as a PC (Personal computer) that executes information processing. The computer 9 changes the settings of the respective controllers (such as the robot controllers 2 and the peripheral device controller 4) via the communication device 3. When there are devices that directly change the settings with respect to the respective controllers other than the computer 9, these devices can be included in the configuration of the interference check system 100A.

The robot production system is configured to include a robot 10, a hand device 6, a vision sensor 7, a peripheral device 5, the peripheral device controller 4, and the robot controller (a robot control device) 2.

The robot 10 is connected to the robot controller 2 and operates according to instructions from the robot controller 2. The robot 10 drives the hand device 6 and the like according to instructions from the robot controller 2.

The hand device 6 is a device driven by the robot 10. The hand device 6 moves so as not to collide with the peripheral device 5 and the like. The vision sensor 7 is an image sensor that captures images near the hand device 6, the peripheral device 5, and the like. The vision sensor 7 is provided, for example, near the hand device 6 and moves together with the hand device 6. The vision sensor 7 moves so as not to collide with the peripheral device 5 and the like.

The peripheral device controller 4 is connected to the peripheral device 5 and controls the peripheral device 5 according to instructions from the computer 9. The peripheral device 5 is a device provided in the vicinity of the robot 10. The peripheral device 5 is connected to the peripheral device controller 4 and operates according to instructions from the peripheral device controller 4.

The robot controller 2 is connected to the robot 10, the hand device 6, and the vision sensor 7, and controls the robot 10, the hand device 6, and the vision sensor 7 according to instructions from the computer 9.

The robot controller 2 includes an interference check device 1X. The interference check device 1X is a device that performs an interference check process (a collision prediction), and checks for the possibility of a collision between the hand device 6 and the peripheral device 5 or the possibility of a collision between the vision sensor 7 and the peripheral device 5 before an actual collision occurs. If there is a possibility of a collision, the interference check device 1X outputs a command value (a command value for stopping the robot or the hand device or correcting the motion trajectory thereof) to the robot 10 or the hand device 6 to avoid the collision. The interference check device 1X can output the command value to the peripheral device 5 to avoid collisions.

The interference check system 100A can include one robot controller 2 or a plurality of robot controllers 2. The interference check system 100A can also include one peripheral device controller 4 or a plurality of peripheral device controllers 4. The robot production system may not include the vision sensor 7.

The interference check device 1X according to the present embodiment models each of the interference check targets (the robot 10, the hand device 6, the vision sensor 7, and the peripheral device 5). When there is a possibility of interference, the interference check device 1X outputs a stop signal to stop the interference check target safely without the occurrence of interference. Because the interference check device 1X can apply the algorithm itself to devices other than the robot controller 2, the interference check device can be configured by using a computation processing device other than the robot controller 2. For example, the interference check device 1X can be provided in the peripheral device controller 4.

The interference check process performed in the present embodiment is described here. In the present embodiment, a space which is formed by a movable range of the robot 10 and through which the robot 10 can pass is expressed as an "operating region". When the operating regions of two or more robots 10 intersect with each other, the robots 10 may collide with each other. As an expression describing a collision between the robots 10, the term "interference" is used for a state where the spaces occupied by the robots 10 intersect with each other at a certain time.

When the robot 10 is represented by a plurality of models, a region occupied by each model is referred to as an "interference determination region", and the term "interference" is used also for a state where the interference determination regions intersect with each other. Checking whether such interference occurs is referred to as an "interference check". To perform an interference check, it is necessary to model each robot 10 by using a plurality of spherical bodies, cylindrical bodies, cuboids, or the like.

For example, when the user designs a robot hand and applies the robot hand to a production system, before an interference check is performed, the robot hand is modeled by a spherical model or the like, and model types (a spherical body, a cylindrical body, or a cuboid), model sizes, arrangement of models (which object constrains a model), and the like are set in advance.

A model value set in advance by a robot manufacturer at the time of shipping can be applied to the robot 10 body. However, the user needs to newly set model values for the hand device 6, the vision sensor 7, and the peripheral device 5, which are designed and selected by the user.

Therefore, the user needs to determine the model size and the model position of each model that will be used in the actual computing through a trial-and-error process. In setting such model conditions, it is necessary to take two restrictions into consideration.

The first restriction is that there is an upper limit to the number of models that can be managed as the model due to the restriction of the communication speed between the robot controllers 2 or the storage allowance of a storage area. The second restriction is that there is an upper limit to the number of processable models. The second restriction is due to the fact that a large calculation resource cannot be used only for the interference check process because the computation processing device of the robot controller 2 generally processes a plurality of tasks.

It has been difficult conventionally to set a model such that a calculation processing amount does not affect other computation processing (for example, trajectory calculation and acceleration/deceleration command generation), while reducing the volume of an enclosure model type as much as possible and taking these restrictions into consideration.

When the external shape of the region desired to be modeled is specified as a cuboid, the interference check device 1X according to the present embodiment automatically extracts a model having a minimum enclosure volume from model candidates that do not affect other computation processing as a calculation processing amount.

Figure 2:
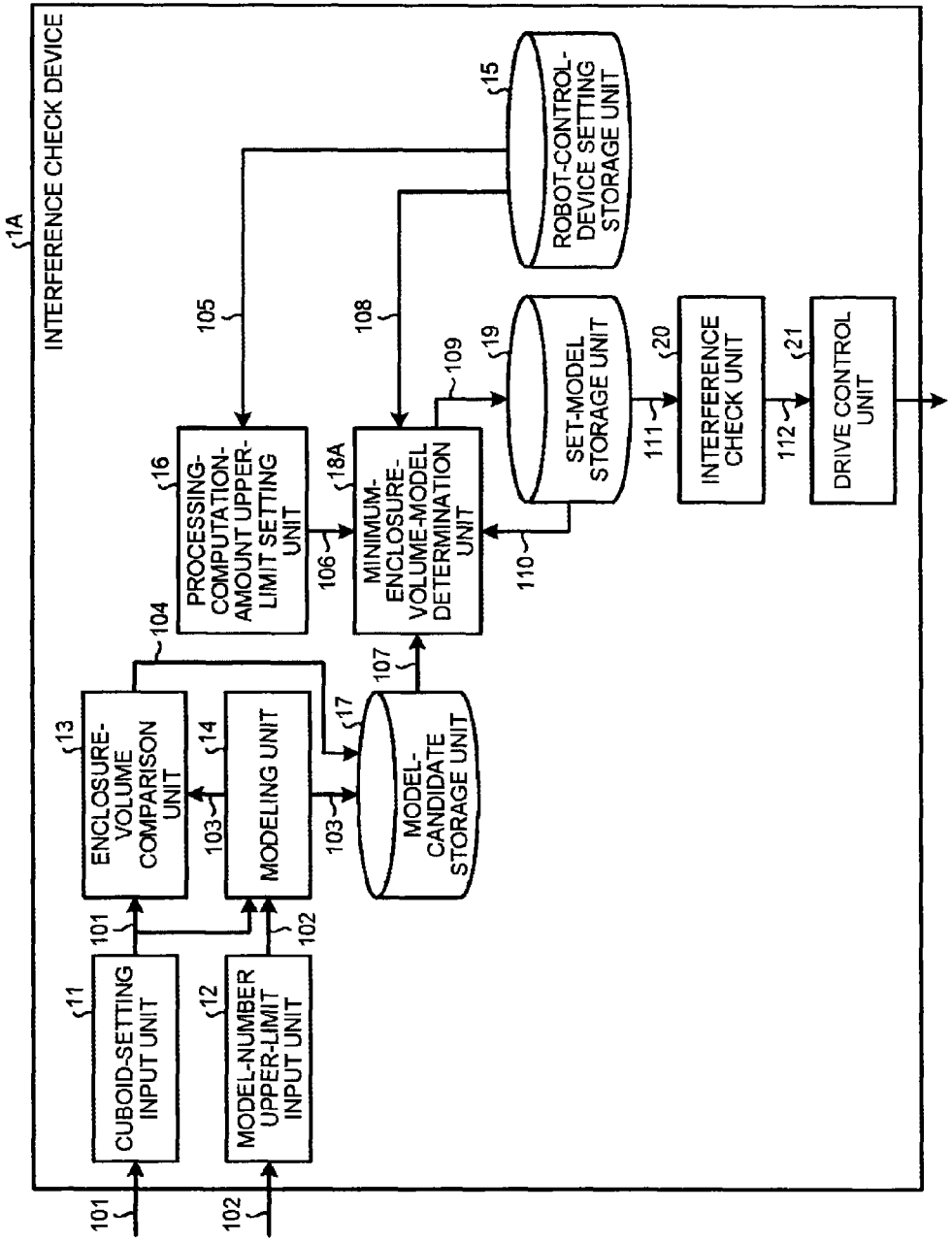
FIG. 2 is a block diagram illustrating the configuration of the interference check device according to the first embodiment.

The configuration of the interference check device 1X is described next. FIG. 2 is a block diagram illustrating the configuration of the interference check device according to the first embodiment. The configuration of an interference check device 1A as an example of the interference check device 1X is described here.

The interference check device 1A includes a cuboid-setting input unit 11, a model-number upper-limit input unit 12, an enclosure-volume comparison unit 13, a modeling unit 14, a model-candidate storage unit 17, a processing-computation-amount upper-limit setting unit 16, a minimum-enclosure-volume-model determination unit 18A, a set-model storage unit 19, a robot-control-device setting storage unit 15, an interference check unit 20, and a drive control unit 21.

The cuboid-setting input unit 11 is an interface to which an instruction to replace a modeling target such as the hand device 6 and the vision sensor 7 with a cuboid (a modeling instruction 101) is input. The modeling instruction 101 is input to the cuboid-setting input unit 11 by the user using a mouse, a keyboard, and the like.

The modeling instruction 101 input to the cuboid-setting input unit 11 includes, for example, a cuboid size, a constraint condition, and the like. The cuboid size is, for example, "L" [mm], "a" [mm], and "b" [mm] (L≥a≥b), which are the lengths of three sides of the cuboid. The constraint condition is the position at which the model is constrained and the posture of the model.

The constraint condition is, for example, information specifying a position that is an attachment reference such as a flange position, an offset amount (X, Y, Z, A, B, C) from the position that is the attachment reference to the attachment position of a model, and the like in the robot 10. In this example, "A" denotes a rotation amount around the X axis, "B" denotes a rotation amount around the Y axis, and "C" denotes a rotation amount around the Z axis.

The rotation amounts and offset amounts are defined on the basis of a specified coordinate system. The coordinate system is defined for each robot axis in advance, and it is assumed that the coordinate system is defined, for example, in the form of a base coordinate system, a first-axis coordinate system, a second-axis coordinate system, a third-axis coordinate system, a fourth-axis coordinate system, a fifth-axis coordinate system, a sixth-axis coordinate system, and a flange-position coordinate system. The cuboid-setting input unit 11 transmits the modeling instruction 101 to the enclosure-volume comparison unit 13 and the modeling unit 14.

The model-number upper-limit input unit 12 is an interface to which a model upper-limit number 102, which is the upper limit of the number of models, is input. The model upper-limit number 102 is input to the model-number upper-limit input unit 12 by the user using a mouse, a keyboard, and the like. The model upper-limit number 102 is the upper limit allowance of the number of models that is allocated to the modeling target. The model upper-limit number 102 is an integral number equal to or larger than one and has no upper limit. The model-number upper-limit input unit 12 transmits the model upper-limit number 102 to the modeling unit 14.

The reason the modeling target is specified as the cuboid is that many of the various shapes in FA (Factory Automation) can be easily enclosed by a rectangular shape and thus the settings are easy. The calculation cost of an inter-model distance and a collision determination using the rectangular shape includes a large amount of information processing, and thus it is difficult to use the rectangular shape for real-time calculation. Therefore, the modeling unit 14 in the interference check device 1A replaces the cuboid model with a spherical or cylindrical (columnar) model, with which information processing can be performed at low unit calculation cost and by real-time calculation.

The modeling unit 14 replaces the modeling target with a spherical model, a cylindrical model, or the like on the basis of the modeling instruction 101, which is an instruction from the user, thereby performing a modeling process. The modeling unit 14 replaces the modeling target with a new geometric model (such as a spherical model or a cylindrical model) having calculation cost per unit distance calculation lower than that of the cuboid, to perform modeling. The modeling unit 14 generates a model by using models in number equal to or less than the upper limit of the number of geometric models (the number of models N) (the model upper-limit number 102) specified by the user with respect to each type of a plurality of types of geometric models.

The "calculation cost per unit distance calculation" is described here by using a specific case. The processing indicates calculation cost involved with one "distance calculation". FIG. 3 is an explanatory diagram of the calculation cost per unit distance calculation when a spherical model determination is performed. For example, as illustrated in FIG. 3, in the case of a determination between spheres (a spherical model determination), the "distance calculation between points" represents the cost of one calculation. If it is assumed that the central point of a certain model i is P1, the central point of another model j is P2, and P1=(X1, Y1, Z1) and P2=(X2, Y2, Z2), a distance $L_{ij}$ between P1 and P2 can be obtained by the following formula.

$$L_{ij}=|P1-P2|=\sqrt{((X1-X2)^2+(Y-Y2)^2+(Z1-Z2)^2)}$$

FIGS. 4A-4F are diagrams illustrating other target examples of the unit distance calculation. As the target of the unit distance calculation, a cylinder 301 (an enclosure body defined by a certain distance from a line segment with opposite ends having a hemispherical shape) illustrated in FIG. 4A, a circular cylinder 302 illustrated in FIG. 4B, and a finite plane (a polygonal shape such as a triangle 303B and a rectangle 303A) illustrated in FIG. 4C and FIG. 4D can be considered. Further, as the target of the unit distance calculation, a cone (a circular cone, a triangular pyramid 305 illustrated in FIG. 4D, and the like), a polyhedron (a tetrahedron, a hexahedron 304 illustrated in FIG. 4C, an octahedron, and the like), and enclosure bodies 306A and 306B (a closed region enclosed by a curved surface having a certain distance from a curved line) illustrated in FIG. 4E and FIG. 4F can be considered.

Figure 5:
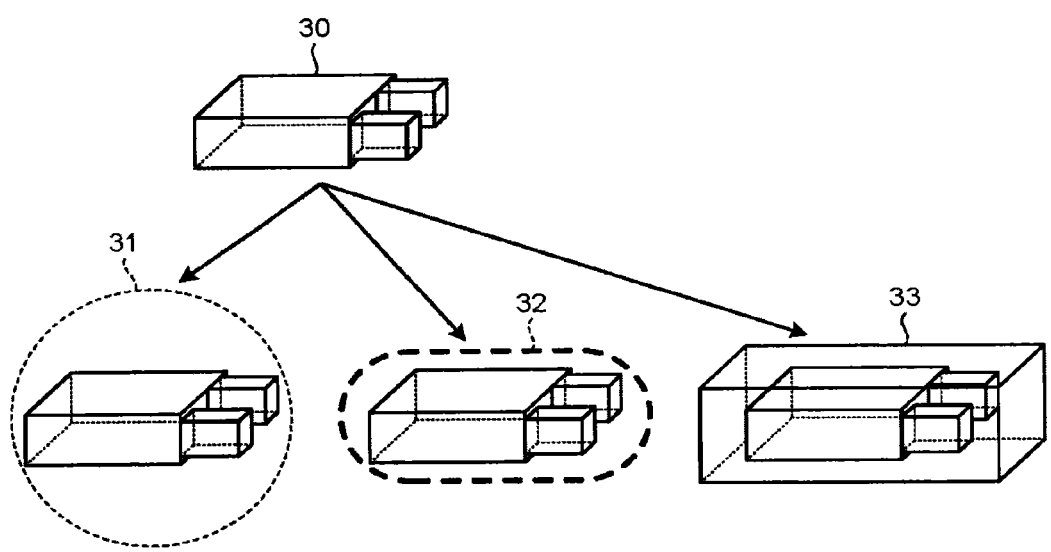
FIG. 5 is an explanatory diagram of a modeling process.

FIG. 5 is an explanatory diagram of a modeling process. In FIG. 5, a modeling process of a case is illustrated where a robot hand 30, which is a part of the hand device 6, is designed and applied to a production system by the user. The modeling unit 14 models the robot hand 30 by a predetermined model on the basis of the modeling instruction 101 and sets the constraint condition on the hand tip side of the robot 10 in the model. FIG. 5 illustrates respective model diagrams when the robot hand 30 is modeled by a spherical model 31, a cylindrical model 32, and a cuboid model 33.

The modeling unit 14 sets the model types (a spherical body, a cylindrical body, a cuboid, and the like), the model sizes, and the arrangement of models (which object constrains a model) on the basis of the modeling instruction 101 before performing an interference check. The modeling unit 14 replaces the modeling target with the spherical model, the cylindrical model, or the like on the basis of the model types, the model sizes, and the arrangement of models specified by the modeling instruction 101. The modeling unit 14 stores the modeling target the model candidate) replaced by the spherical model, the cylindrical model, or the like as model information 103 in the model-candidate storage unit 17. The model information 103 is information on the model candidates and includes the model candidate itself, the number of respective models, the type of respective models, the size of respective models, and the arrangement of respective models. The modeling unit 14 generates a plurality of model candidates and stores each of the model candidates in the model-candidate storage unit 17.

The enclosure-volume comparison unit 13 calculates the excess-enclosure volume ratio of the model to the modeling target on the basis of the cuboid size in the modeling instruction 101 and the model information 103. The excess-enclosure volume ratio is a value obtained by dividing the volume of the model excessively enclosing the modeling target by the volume of the modeling target. The enclosure-volume comparison unit 13 calculates the volume of the modeling target on the basis of the cuboid size in the modeling instruction 101 and calculates the volume of the model on the basis of the model information 103. The enclosure-volume comparison unit 13 stores the calculated excess-enclosure volume ratio as a modeling excess amount 104 in the model-candidate storage unit 17. The enclosure-volume comparison unit 13 can store a limit value (an allowance) of the volume of the model in the model-candidate storage unit 17 as the modeling excess amount 104 instead of the excess-enclosure volume ratio. The limit value of the volume of the model can be a ratio or a difference with respect to the volume of the modeling target.

The model-candidate storage unit 17 is a memory or the like that stores therein the model information 103 and the modeling excess amount 104. The model-candidate storage unit 17 stores therein the model information 103 and the modeling excess amount 104 in association with each other.

The robot-control-device setting storage unit 15 is a memory or the like that stores therein information relating to the computation processing amount required for each process performed by each controller as processing information 105. The processing information 105 includes, for example, optional processing-function information that is valid in each controller, the computation processing time of each processing function, and the computation processing time in one control cycle.

The robot-control-device setting storage unit 15 stores therein the interference check determination time for each unit model (a computation amount required for each model unit) to be processed by each of the robot controllers 2 as a model-unit computation amount 108.

The processing-computation-amount upper-limit setting unit 16 reads the processing information 105 from the robot-control-device setting storage unit 15 and calculates a computation processing time 106 (a computation upper limit amount) that can be used for an interference check by the robot controllers 2 on the basis of the processing information 105. The processing-computation-amount upper-limit setting unit 16 outputs the calculated computation processing time 106 to the minimum-enclosure-volume-model determination unit 18A.

The set-model storage unit 19 stores therein information required for the model arrangement for an interference check included in the model information 103, such as the type of respective models, the number of respective models, the size of respective models, and the arrangement information on respective models allocated to the robot arm (the robot 10 and the hand device 6), the vision sensor 7, and the peripheral device 5.

At the time of setting a new model, a minimum enclosure-volume model 109 in the set-model storage unit 19 is read as set-model information 110. The set-model information 110 is, for example, information on the model type and the number of models of the model allocated to the robot arm (the robot 10 and the hand device 6). At the time of performing the interference check, the minimum enclosure-volume model 109 in the set-model storage unit 19 is directly read.

The minimum-enclosure-volume-model determination unit 18A reads the model information 103 and the modeling excess amount 104 as model candidate information 107 from the model-candidate storage unit 17. The minimum-enclosure-volume-model determination unit 18A also reads the model-unit computation amount 108 from the robot-control-device setting storage unit 15 and reads the set-model information 110 from the set-model storage unit 19.

The minimum-enclosure-volume-model determination unit 18A extracts a model candidate satisfying the threshold limit of the processing computation amount from the model candidates. Specifically, the minimum-enclosure-volume-model determination unit 18A calculates the number of calculations required for one interference check with respect to each model candidate, on the basis of the set-model information 110 and the model candidate information 107. The minimum-enclosure-volume-model determination unit 18A also calculates the calculation processing time required for one interference check for each combination of a cylindrical body and a spherical body on the basis of the calculated number of calculations and the model-unit computation amount 108. The minimum-enclosure-volume-model determination unit 18A repeats the calculation processing "number of model types × number of models" times.

The minimum-enclosure-volume-model determination unit 18A compares the calculation processing time for each interference check and the computation processing time 106 that can be used for an interference check. The minimum-enclosure-volume-model determination unit 18A extracts, from the model candidates, only the model candidates that can perform an interference check in the calculation processing time shorter than the computation processing time 106 that can be used for the interference check. The minimum-enclosure-volume-model determination unit 18A selects a model candidate having the smallest modeling excess amount 104 from the extracted model candidates and stores the selected model candidate in the set-model storage unit 19 as the minimum enclosure-volume model 109. At this time, when there is an old minimum enclosure-volume model 109 with respect to one modeling target in the set-model storage unit 19, the minimum-enclosure-volume-model determination unit 18A overwrites the old minimum enclosure-volume model 109 with the new minimum enclosure-volume model 109.

The interference check unit 20 performs an interference check by using the minimum enclosure-volume model 109 stored in the set-model storage unit 19. At this time, the interference check unit 20 performs the interference check by using the model size and a model-position constraint condition 111 set in the minimum enclosure-volume model 109. The model-position constraint condition 111 is a condition relating to the position where the model is constrained and the posture thereof and is included in the modeling instruction 101.

When the interference check unit 20 determines that there is a possibility of interference, the interference check unit 20 outputs an operation stop command to the drive control unit 21. When the interference check unit 20 determines that there is no possibility of interference, the interference check unit 20 outputs an operation continuation command to the drive control unit 21. The interference check unit 20 outputs the operation stop command or the operation continuation command to the drive control unit 21 as an operation-change command value 112. The drive control unit 21 executes drive control according to the operation-change command value 112 with respect to the robot 10 and the hand device 6.

The process procedure of the interference check process performed by the interference check device 1A is described next. The modeling instruction 101 is input to the cuboid-setting input unit 11 in advance by the user. The cuboid-setting input unit 11 transmits the modeling instruction 101 to the enclosure-volume comparison unit 13 and the modeling unit 14. The model upper-limit number 102 is input to the model-number upper-limit input unit 12 in advance by the user. The model-number upper-limit input unit 12 transmits the model upper-limit number 102 to the modeling unit 14.

The modeling unit 14 stores in advance, in the model-candidate storage unit 17, the model information 103 (the number of respective models, the type of respective models, the size of respective models, and the arrangement of respective models) to be used when the modeling process is performed according to the modeling instruction 101. The modeling unit 14 transmits the model information 103 to the enclosure-volume comparison unit 13.

The modeling unit 14 replaces the cuboid modeling target with a spherical model, a cylindrical model, or the like on the basis of the modeling instruction 101 and the model upper-limit number 102. Accordingly, the modeling unit 14 performs the modeling process with respect to the modeling target to generate a plurality of model candidates. The modeling unit 14 includes the model candidates in the model information 103 and stores the model information 103 in the model-candidate storage unit 17.

Figure 6:
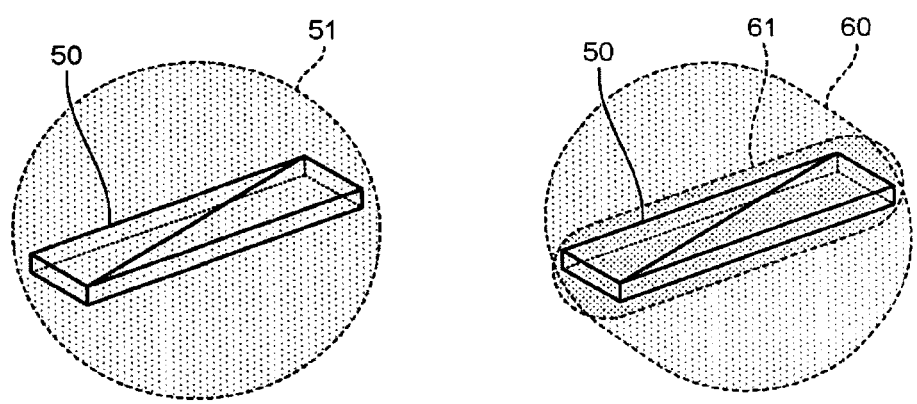
FIG. 6 is a diagram illustrating an example of a model when the model-number upper limit is set to one.
Figure 7:
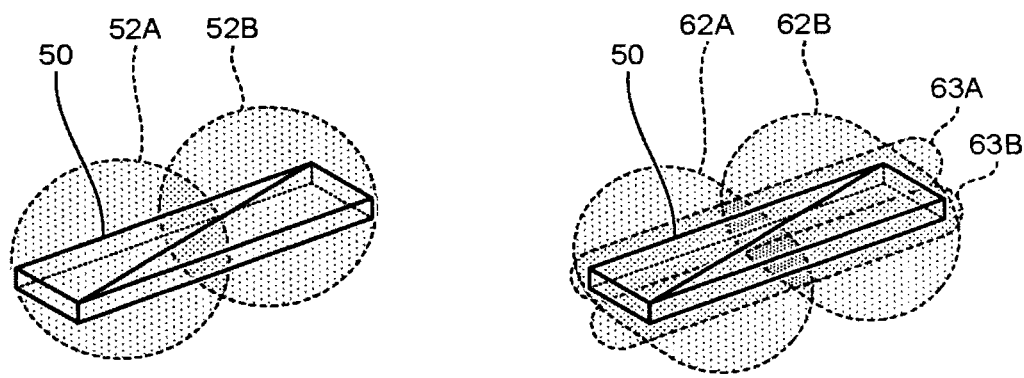
FIG. 7 is a diagram illustrating an example of a model when the model-number upper limit is set to two.

The number of models and the excess-enclosure volume ratio are described here. Generally, as the number of models increases, the amount of error included in the model (the amount of error between the model and the modeling target) decreases. The amount of error does not decrease simply. FIG. 6 is a diagram illustrating an example of a model when the model-number upper limit is set to one. FIG. 7 is a diagram illustrating an example of a model when the model-number upper limit is set to two.

FIG. 6 illustrates a model 51, in which a cuboid shape (a long and thin object) 50 is modeled by a spherical body, and models 60 and 61, in which the cuboid shape 50 is modeled by a cylindrical body, with a restriction that one model can be used. The cylindrical body is in a shape in which a spherical body is stretched, and the enclosure directions thereof have two patterns in descending order of the length in the longitudinal direction. In FIG. 6, a model modeled by a cylindrical body having the same longitudinal direction as the longitudinal direction of the cuboid shape 50 is represented by the model 61, and a model modeled by a cylindrical body having the longitudinal direction perpendicular to the longitudinal direction of the cuboid shape 50 is represented by the model 60.

In the case where the model-number upper limit is set to one, when the cuboid shape 50 is modeled by a spherical body, modeling is performed such that the model using the spherical body has a minimum volume; therefore, the model 51 is set. Further, in the case where the model-number upper limit is set to one, when the cuboid shape 50 is modeled by a cylindrical body, modeling is performed such that the model using the cylindrical body has a minimum volume; therefore, the model 61 is set.

FIG. 7 illustrates models 52A and 52B, in which the cuboid shape 50 is modeled by spherical bodies, and models 62A and 62B, and models 63A and 63B, in which the cuboid shape 50 is modeled by cylindrical bodies, with a restriction that two or less models can be used. When the model-number upper limit is set to two, the cuboid shape 50 can be modeled by one spherical body or one cylindrical body. However, in this case, the cuboid shape 50 becomes the same model as in FIG. 6. Therefore, illustrations thereof are omitted in FIG. 7.

In FIG. 7, models modeled by cylindrical bodies having the same longitudinal direction as the longitudinal direction of the cuboid shape 50 are represented by the models 63A and 63B, and models modeled by cylindrical bodies having the longitudinal direction perpendicular to the longitudinal direction of the cuboid shape 50 are represented by the models 62A and 62B.

In the case where the model-number upper limit is set to two, when the cuboid shape 50 is modeled by spherical bodies, modeling is performed such that the model using the spherical bodies has a minimum volume; therefore, the models 52A and 52B are set. Further, in the case where the model-number upper limit is set to two, when the cuboid shape 50 is modeled by cylindrical bodies, modeling is performed such that the model using the cylindrical bodies has a minimum volume; therefore, the models 63A and 63B are set.

As illustrated in FIG. 6 and FIG. 7, when a cylindrical model is used for modeling, it can be understood that there is less waste in modeling (the enclosure volume). This can be presumed by human trial-and-error process. However, the calculation amount required for an interference check between spherical bodies and an interference check between cylindrical bodies increases by several times compared with the case of a spherical body. Therefore, because, depending on a model configuration, the calculation amount increases too much, the amount of throughput in the interference check process of the entire processing performed by the robot controller 2 may become too large.

Figure 8:
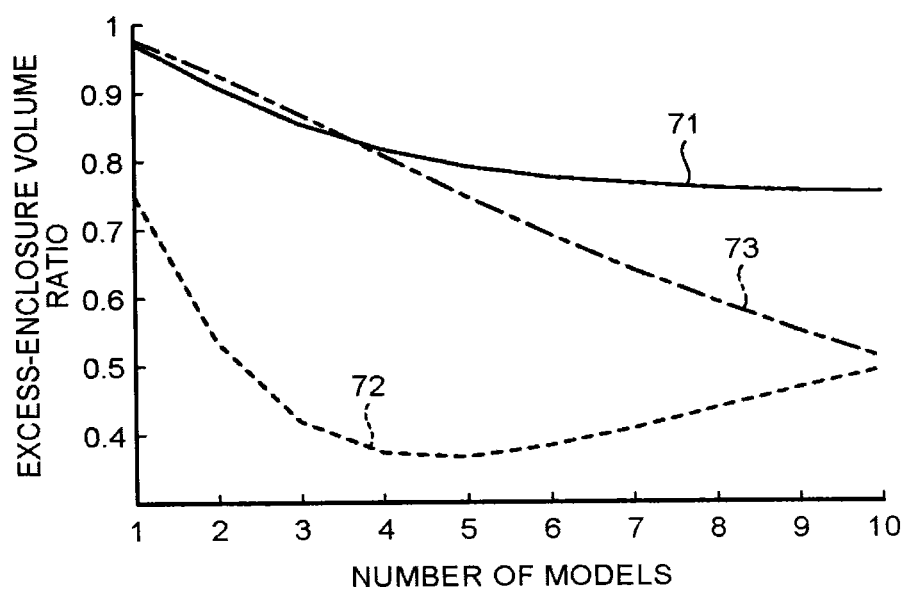
FIG. 8 is a diagram illustrating the relation between the number of models and the excess-enclosure volume ratio.

FIG. 8 is a diagram illustrating the relation between the number of models and the excess-enclosure volume ratio. In FIG. 8, the relation between the number of models and the excess-enclosure volume ratio when a spherical model (a sphere) is used is represented by a relation 71. Further, the relation between the number of models and the excess-enclosure volume ratio when a cylindrical model (a cylinder) is used is represented by relations 72 and 73. The relation 72 represents a relation when the longitudinal direction of the cylindrical model is "L", and the relation 73 represents a relation when the longitudinal direction thereof is "a".

In FIG. 8, the number of models is plotted on the horizontal axis and the excess-enclosure volume ratio is plotted on the vertical axis. The excess-enclosure volume ratio in this example is an amount obtained by dividing the volume excessively enclosing the cuboid model by the volume of the cuboid model where a case of just enclosing a cuboid model (a modeling target) is set to 0. In other words, the excess-enclosure volume ratio represents a proportion expressing the amount of excessive enclosure.

As illustrated in FIG. 8, when the extent of the usable number of models is large, it has been found that in an arrangement in which the number of models is simply increased, the excess enclosure amount increases by increasing the number of models.

Under such circumstances, the modeling unit 14 uses two pieces of information (the modeling instruction 101 and the model upper-limit number 102) specified in advance by the user to perform a modeling process "number of model types M x number of models N" times. N and M here are natural numbers. The number of models N is determined by the model upper-limit number 102. When the model type is "spherical body", "cylindrical body", and "spherical body and cylindrical body", the number of model types M is three. That is, the number of model types refers to the number of all combinations that can be calculated on the basis of the number of models to be used and the model type. In this case, the modeling unit 14 performs the modeling process N times for a case of applying a spherical model, performs the modeling process N times for a case of applying a cylindrical model, and performs the modeling process N times for a case of applying a spherical model and a cylindrical body. Accordingly, the modeling unit 14 performs the modeling process M×N times.

In the modeling process for each model type, the modeling unit 14 performs a process of dividing the model itself into k (k=1 to N) cuboids, assuming that the upper limit obtained from the model-number upper-limit input unit 12 is N. A method of dividing the model into k is different for each type of models. With regard to this, an example of a modeling rule for each model type is described below.

When a spherical body is used as the model type, effective enclosure can be performed by diving the modeling target into cuboids approximate to a cubic shape as much as possible with respect to the provided modeling instruction 101. Therefore, an objective of the division becomes a rule of creating as many models approximate to a cubic shape as possible. In the case of a spherical model, a central position Pcnt_ki can be obtained according to the following formula (1) by using end points $P1_{ki}$, $P2_{ki}$, $P3_{ki}$, $P4_{ki}$, $P5_{ki}$, $P6_{ki}$, $P7_{ki}$, and $P8_{ki}$ of the ki-th (i=1, . . . , N) cuboid after the division, and a radius R can be obtained according to the following formula (2), where norm(*) is a function for calculating the norm of a vector of *.

$$\text{Pcnt\_ki} = (P1_{ki} + P2_{ki} + P3_{ki} + P4_{ki} + P5_{ki} + P6_{ki} + P7_{ki} + P8_{ki})/8 \quad (1)$$

$$R = \text{norm}(\text{Pcnt\_ki} - P1_{ki}) \quad (2)$$

In the case of a spherical body, an arrangement that realizes the minimum enclosure volume with a model of the specified model type (a spherical body or a cylindrical body) is automatically calculated under a condition where the usable number of models is k (k=1 to N). As a method of an arrangement, the cuboid provided by the modeling instruction 101 is divided by the specified number of divisions in a specified direction represented below, to define a spherical body capable of minimally enclosing the divided cuboid.

This is described below by using the lengths of three sides of the cuboid, i.e., "L" [mm], "a" [mm], and "b" [mm] (L≤a≤b). The dividing direction and the number of divisions are defined such that the number of divisions in the defining direction of "L" [mm] is k_L [times], the number of divisions in the defining direction of "a" [mm] is k_a [times], and the number of divisions in the defining direction of "b" [mm] is k_b [times], and respectively start from k_L=0, k_a=0, and k_b=0. First, k_L is increased, and if k_L satisfies a predetermined condition according to a procedure described later, k_a is increased. Similarly, if k_a satisfies a predetermined condition, k_b is increased, thereby performing division. k_L, k_a, and k_b are respectively increased by one, every time the number of divisions in the respective directions is increased. Thereafter, the number of divisions of the cuboid provided by the modeling instruction 101 is defined as k_tot=k_L+k_a+k_b, and the cuboid provided by the modeling instruction 101 is divided until the number of cuboids (k_tot+1) after the division reaches the usable number of models k.

When division is performed in each direction, such a procedure is used that one cuboid is divided into two cuboids in one division. When the usable number of models k is determined as described below, the modeling unit 14 performs a predetermined division process until k_tot reaches k in the modeling process. Accordingly, k_tot reaches k and the divided cuboids are uniquely determined.

The minimally enclosing spherical body in this case is a spherical body with a diagonal line of the divided cuboids as expressed by formula (2) as a diameter. The predetermined division process of the modeling process in the modeling unit 14 is described below. First, in the case of being divided into k_L, it is checked whether the following condition (formula (3)) is satisfied. If formula (3) is satisfied, k_L is increased by 1 to continue the division process.

$$L/(k\_L+1) \geq a \quad (3)$$

If formula (3) is not satisfied, the longitudinal direction in which division is performed is changed to the defining direction of "a" [mm] to perform division. When the division direction is to be changed, the initial k_L by which L/(k_L+1)<a is satisfied is designated as k_L0, and the difference between the initial k_L and the current k is designated as Δk=k−(k_L0+1). If Δk>0, it is checked whether the following condition (formula (4)) is satisfied.

$$a \leq L/(k\_L0+1) \quad (4)$$

If the condition of formula (4) is satisfied, division into two parts designating the longitudinal direction as the defining direction of "a" [mm] is performed. As a division method, in the case of (k_L0+1)≤Δk, Δk cuboids among the (k_L0+1) cuboids are divided into two parts in the direction of the longitudinal direction "a", thereby completing the division. The division target is modeled from, for example, the side close to the hand tip. In the case of (k_L0+1)≤Δk, after the process of dividing the cuboid into two parts is performed in the direction of the longitudinal direction "a" k0 times, it is checked whether the following condition (formula (5)) is satisfied.

$$L/(k\_L0+1) \geq a/2 \quad (5)$$

If formula (5) is satisfied, the division direction is changed, and the defining direction of the longitudinal direction "L" [mm] is divided into k_L0+1. If formula (5) is not satisfied, the division in the defining direction of the longitudinal direction "a" [mm] is continued. In order to generalize the process up to formula (5) together with division in the direction "b", when it is assumed that the number of divisions of the respective sides "L", "a", and "b" with respect to the respective current axial directions is k_Ln [times], k_an [times], and k_bn [times] (provided that n=0, 1, 2, . . . ) as respective conditions, the largest number of divisions as viewed from the respective axial directions (the direction "L", the direction "a", the direction "b") when another longitudinal direction is generated in each stage, such as the definition of k_L0, is defined as k_Ln, k_an, and k_bn. These are defined in each stage and the lengths L/k_Ln, a/k_an, and b/k_bn are compared every time the number of divisions k_L, k_a, and k_b in the respective directions increases. In this case, L is divided first, and at a point in time when the following formula (6) is satisfied, the division direction is switched to "a". At a point in time when the following formula (7) is satisfied, it is checked whether the following formula (8) is satisfied.

$$L/(k\_Ln+1) < a/(k\_an+1) \quad (6)$$

$$L/(k\_Ln+1) \geq a/(k\_an+1) \quad (7)$$

$$L/(k\_Ln+1) < a/(k\_bn+1) \quad (8)$$

If formula (8) is satisfied, the number of divisions in the direction "b" is increased by one. In contrast, if formula (8) is not satisfied, the number of divisions in the direction "L" is increased again by one. In the case when the number of divisions is increased, when k_tot=k_L+k_a+k_b has reached k−1, the division ends and a spherical model is defined according to formula (1) and formula (2). Through this process, a cuboid defined by the division and the position and the size of the spherical model corresponding thereto are obtained with respect to each of the cases of k=1 to N.

When a cylindrical body is used as the model type, effective enclosure can be realized by generating an object having a long shape with the end faces being a square. Therefore, division in the direction "L" is not performed and division in the direction "a" or in the direction "b" is performed, thereby continuing the division such that the cross-sectional surface after division perpendicular to the direction "L" approximates a square as much as possible. As a method of obtaining a cylindrical body when division is completed, end points $P1_{ki}$, $P2_{ki}$, $P3_{ki}$, $P4_{ki}$, $P5_{ki}$, $P6_{ki}$, $P7_{ki}$, and $P8_{ki}$ of the ki-th (i=1, . . . , N) cuboid after the division are used. Specifically, the central position (a reference point) Pcnt_ki can be obtained according to the following formula (9), and a length L and the radius R of the model can be obtained according to the following formula (10).

If it is assumed that the end points closer to the central position Pcnt_ki in a coordinate system constrained at a point along a surface perpendicular to the direction "L" are $P1_{ki}$, $P2_{ki}$, $P3_{ki}$, and $P4_{ki}$, and the end points farther from the central position Pcnt_ki are $P5_{ki}$, $P6_{ki}$, $P7_{ki}$, and $P8_{ki-th}$, the following formulas (9) and (10) are established.

$$Pcnt\_ki = (P1_{ki} + P2_{ki} + P3_{ki} + P4_{ki})/4 \quad (9)$$

$$R = \mathrm{norm}(Pcnt\_ki - P1_{ki}) \quad (10)$$

A rule for actual divisions for k times is that division is continued following the same rule as that of the direction of a spherical body, other than the condition that division is performed only in the directions "a" and "b". Division is complete at a point in time when the division is completed and a cylindrical body for modeling each cuboid on the basis of formulas (9) and (10) is obtained.

Modeling in the case of combining a spherical body and a cylindrical body as the model type is described next. The division method is that division is performed according to the same division method as that of a spherical body. Only the rule for allocating the model type to k (k=1 to N) models after the division as the result of the division is different from that in the case of the spherical model. As a basic method, a method of adopting a model having the smallest excess volume ratio after allocating a spherical body and a cylindrical body to each cuboid is executed. Through the processes described above, M×N model candidates are eventually calculated.

For the M×N model candidates, the enclosure-volume comparison unit 13 calculates the modeling excess amount 104 on the basis of the k model positions and the k model sizes of each model candidate and the size of the cuboid set by each user.

Specifically, the enclosure-volume comparison unit 13 extracts a model position and a model size of a model candidate from the model information 103, and extracts the size of the cuboid (the modeling target) from the modeling instruction 101. The enclosure-volume comparison unit 13 then calculates the volume of the model candidate on the basis of the model position and the model size and calculates the volume of the modeling target on the basis of the size of the modeling target. Further, the enclosure-volume comparison unit 13 calculates the modeling excess amount 104 (the excess-enclosure volume ratio) relating to the volume of the model candidate by using the volume of the modeling target as a reference. As the modeling excess amount, a value other than the excess-enclosure volume ratio can be defined.

A calculation method of the excess-enclosure volume ratio is described here. When it is assumed that the excess-enclosure volume ratio is Wst, the volume of the cuboid defined by the user is Vblock [mm^3], the sum of the volumes of the models after division is Vmdl [mm^3], the volume of a space in Vmdl that does not overlap with the cuboid defined by the user is Vwst [mm^3], and the volume of a region in which the models after division overlap with each other is Vovrp [mm^3], Wst and Vwst can be defined respectively by the following formulas (11) and (12).

$$Wst = Vwst / Vblock \quad (11)$$

$$Vwst = Vmdl - Vovrp - Vblock \quad (12)$$

In other words, the excess volume due to modeling can be calculated by (excess volume)=(total volume modeled by sphere/cylinder on the basis of cuboid defined by user)−(volume of overlapping portion of volume modeled by sphere/cylinder)−(volume of cuboid defined by user).

The enclosure-volume comparison unit 13 calculates the excess-enclosure volume ratio on the basis of formula (11) and formula (12) and stores the excess-enclosure volume ratio in the model-candidate storage unit 17 as the modeling excess amount 104. As the modeling excess amount, a value, other than the excess-enclosure volume ratio, calculated on the basis of a straight line extending in the vertical direction from a point on a surface of the cuboid defined by the user and the generated model region can be applied. In this case, intersections (two points) of the straight line extending in the vertical direction from the point on the surface of the cuboid and a surface of the generated model are derived, and the distance between the intersections is defined as an excess radius Rwst, which is then evaluated as the modeling excess amount 104.

The model-candidate storage unit 17 stores therein the model information 103 on the M×N model candidates and the modeling excess amount 104 of each model candidate in association with each other. After the information relating to all the M×N model candidates has been stored in the model-candidate storage unit 17, the minimum-enclosure-volume-model determination unit 18A reads, from the model-candidate storage unit 17, the model information 103 (respective model types, respective model positions, respective model sizes, and respective number of models of the M×N model candidates) and the modeling excess amount 104 of each model candidate, as the model candidate information 107.

The processing-computation-amount upper-limit setting unit 16 reads, from the robot-control-device setting storage unit 15, the optional processing-function information that is valid in each controller, the computation processing time of each processing function, and the computation processing time in one control cycle, as the processing information 105.

The processing-computation-amount upper-limit setting unit 16 then calculates the computation processing time 106 that can be used for an interference check by the robot controller 2 on the basis of the processing information 105 and outputs the calculation result to the minimum-enclosure-volume-model determination unit 18A.

The minimum-enclosure-volume-model determination unit 18A reads, from the robot-control-device setting storage unit 15, the interference check determination time (between spherical bodies, between a cylindrical body and a spherical body, and between cylindrical bodies) for each unit model to be processed by each of the robot controllers 2 as the model-unit computation amount 108. The model-unit computation amount 108 is the computation amount required for the interference check for each model unit and is set for each model unit. The model-unit computation amount 108 is set, for example, for each combination of a cylindrical body and a spherical body (a spherical body and a spherical body, a cylindrical body and a spherical body, and a cylindrical body and a cylindrical body).

The minimum-enclosure-volume-model determination unit 18A reads, from the set-model storage unit 19, information on the model type with respect to the robot arm that has been set in advance and the number of models as the set-model information 110.

The minimum-enclosure-volume-model determination unit 18A calculates the number of calculations required for one interference check on the basis of the set-model information 110 and the model type and the number of models in the model candidate information 107. The minimum-enclosure-volume-model determination unit 18A calculates the number of calculations for each combination of a spherical body and a spherical body, a cylindrical body and a spherical body, and a cylindrical body and a cylindrical body.

Furthermore, the minimum-enclosure-volume-model determination unit 18A calculates the calculation processing time required for one interference check for each combination of a cylindrical body and a spherical body, on the basis of the calculated number of calculations and the model-unit computation amount 108. The minimum-enclosure-volume-model determination unit 18A repeats the calculation processing "number of model types × number of models (M×N)" times.

The minimum-enclosure-volume-model determination unit 18A compares the calculation processing time of M×N interference checks and the computation processing time 106 that can be used for the interference check. The minimum-enclosure-volume-model determination unit 18A extracts, from the model candidates, only model candidates that can perform an interference check in the calculation processing time shorter than the computation processing time 106.

The minimum-enclosure-volume-model determination unit 18A selects a model candidate having the smallest modeling excess amount 104 from the extracted model candidates and stores the selected model candidate in the set-model storage unit 19 as the minimum enclosure-volume model 109. If a model candidate cannot be extracted, the minimum-enclosure-volume-model determination unit 18A causes a display device or the like (not illustrated) to display an error.

The interference check unit 20 performs an interference check by using the minimum enclosure-volume model 109 stored in the set-model storage unit 19. Specifically, the interference check unit 20 performs the interference check by using the model size and the model-position constraint condition 111 set in the minimum enclosure-volume model 109.

The interference check unit 20 updates the current position of the model by using, for example, information relating to an angle of a joint of the robot 10 (robot joint angle information). If the distance between the models becomes 0 or equal to or less than a predetermined distance, the interference check unit 20 outputs an operation stop command to stop the robot 10 or the like to the drive control unit 21. If there is no possibility of interference, the interference check unit 20 outputs an operation continuation command to the drive control unit 21. Accordingly, the drive control unit 21 executes drive control according to the operation-change command value 112 with respect to the robot 10 and the hand device 6.

Figure 9:
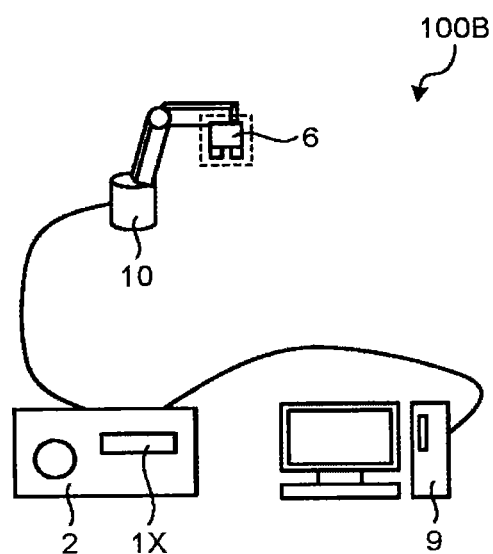
FIG. 9 is a diagram illustrating another configuration example of the interference check system.

The configuration of the interference check system 100A is not limited to the configuration illustrated in FIG. 1 and can be a different configuration. FIG. 9 is a diagram illustrating another configuration example of the interference check system. An interference check system 100B is configured to include a robot production system and a computer 9. The robot production system in the interference check system 100B is configured to include the robot 10, the hand device 6, and the robot controller 2.

Even in the configuration illustrated as the interference check system 100B, the user can access the robot controller 2 to change model settings. Further, in the interference check system 100A, the processing-computation-amount upper-limit setting unit 16, the interference check unit 20, the drive control unit 21, and the like of the interference check device 1A can be arranged in a different device.

In this manner, when the user specifies a cuboid shape (a cuboid size) that encloses a modeling target and the model upper-limit number 102, it is possible to automatically perform type selection of a model having the smallest enclosure volume within a range of the model upper-limit number 102 with the calculation cost being taken into consideration. Accordingly, even an operator having no knowledge of modeling can easily perform an effective interference check by using the user interface.

As described above, according to the first embodiment, a model is set on the basis of the modeling instruction 101 and the model upper-limit number 102. Accordingly, a model having the minimum enclosure volume of the model can be easily generated within limited calculation cost. Further, when a plurality of hand devices 6 or the like are to be modeled, the user can easily plan how much detailed modeling is performed on each hand device 6 by setting the permissible model upper-limit number 102.

Second Embodiment.

A second embodiment of the present invention is described with reference to FIG. 10. In the second embodiment, in an interference check device, the model upper-limit number 102 is derived on the basis of a limit value to the modeling excess amount 104 (a permissible modeling excess amount 113) instead of inputting the model upper-limit number 102 from the model-number upper-limit input unit 12.

Figure 10:
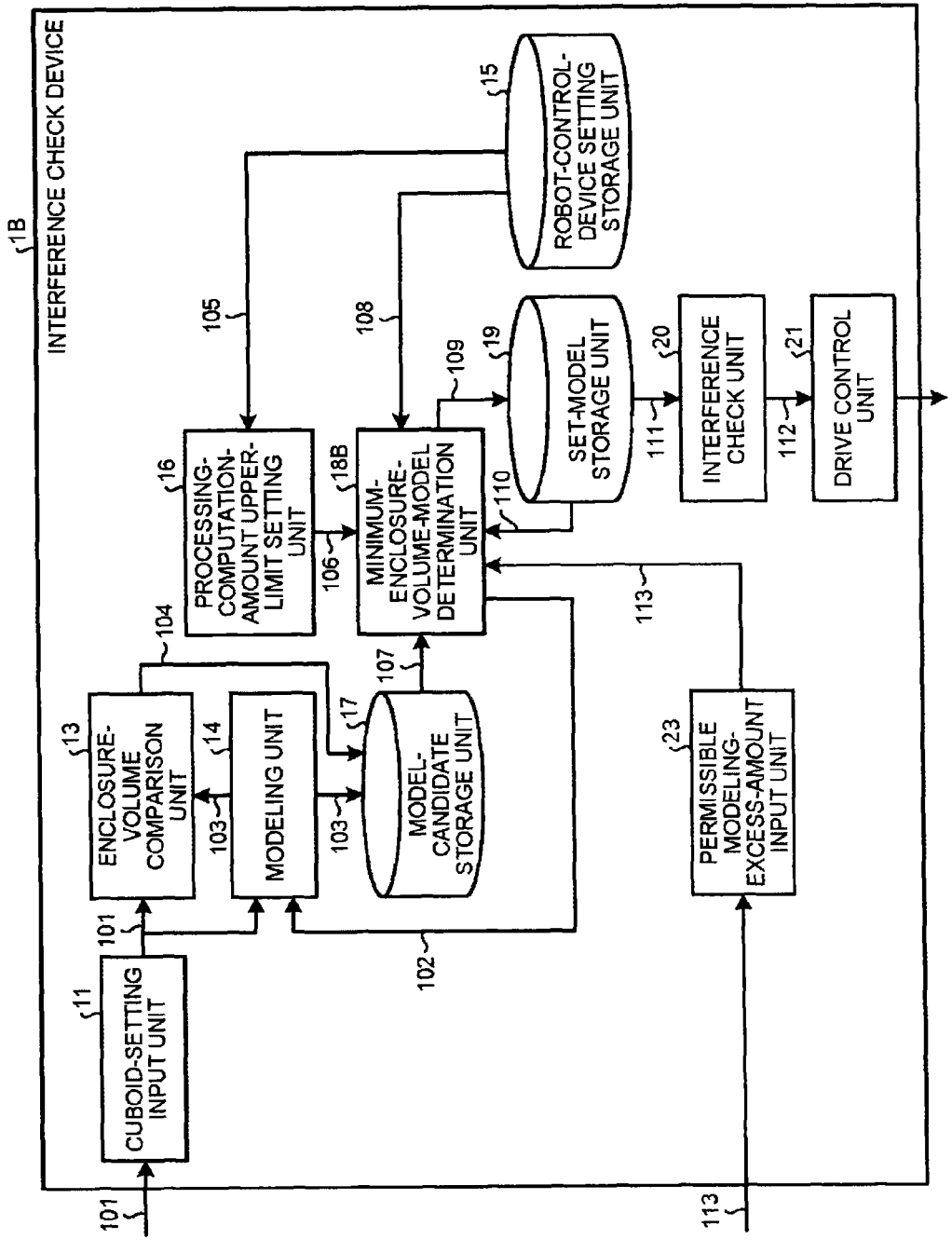
FIG. 10 is a block diagram illustrating a configuration of an interference check device according to a second embodiment.

FIG. 10 is a block diagram illustrating a configuration of the interference check device according to the second embodiment. The configuration of an interference check device IB as an example of the interference check device 1X is described here. Among the constituent elements illustrated in FIG. 10, constituent elements achieving identical functions as those of the interference check device 1A according to the first embodiment illustrated in FIG. 2 are denoted by like reference signs and redundant explanations thereof are omitted.

The interference check device 1B includes the cuboid-setting input unit 11, the enclosure-volume comparison unit 13, the modeling unit 14, the model-candidate storage unit 17, the processing-computation-amount upper-limit setting unit 16, a minimum-enclosure-volume-model determination unit 18B, the set-model storage unit 19, the robot-control-device setting storage unit 15, the interference check unit 20, the drive control unit 21, and a permissible modeling-excess-amount input unit 23.

The permissible modeling-excess-amount input unit (limit-value input unit) 23 is an interface to which a limit value to the modeling excess amount 104 (the permissible modeling excess amount 113) is input. The permissible modeling excess amount 113 is input to the permissible modeling-excess-amount input unit 23 by the user by using a mouse, a keyboard, and the like. The permissible modeling-excess-amount input unit 23 transmits the permissible modeling excess amount 113 to the minimum-enclosure-volume-model determination unit 18B.

In the present embodiment, because the permissible modeling excess amount 113 is set, a limit value of the number of models (the model upper-limit number 102) may not be provided. In FIG. 10, the configuration in which the interference check device 113 does not include the model-number upper-limit input unit 12 is illustrated.

When the model upper-limit number 102 is not provided, the minimum-enclosure-volume-model determination unit 18B uses the computation processing time 106, the model-unit computation amount 108, and the set-model information 110 to derive the model upper-limit number 102. Specifically, the minimum-enclosure-volume-model determination unit 18B obtains a determination processing time Tarm [s] required for an interference check between robot arms on the basis of the set-model information 110 and the model-unit computation amount 108 that have been set in advance. The minimum-enclosure-volume-model determination unit 18B subtracts Tarm from the computation processing time 106.

The minimum-enclosure-volume-model determination unit 18B obtains the number of spherical models that can be increased by being added to the set-model information 110 up to the upper limit that satisfies the subtraction result (time) by using the model-unit computation amount 108 and defines the number as an upper-limit number of models Nmax (the model upper-limit number 102). In other words, the minimum-enclosure-volume-model determination unit 18B adds the number of spherical models to the set-model information 110 until reaching the upper limit time of the subtraction result in order to obtain the number of spherical models to be added, which becomes the upper limit time of the subtraction result. Accordingly, the interference check device 1B can calculate the maximum number of models Nmax that can be processed by the robot controller 2.

The minimum-enclosure-volume-model determination unit 18B transmits the derived model upper-limit number 102 to the modeling unit 14. The modeling unit 14 generates model candidates according to the process similar to that of the first embodiment and stores the model candidates as the model information 103 in the model-candidate storage unit 17. Further, the enclosure-volume comparison unit 13 stores the modeling excess amount 104 in the model-candidate storage unit 17 according to the process similar to that of the first embodiment.

The minimum-enclosure-volume-model determination unit 18B compares the permissible modeling excess amount 113 with the modeling excess amount 104. The minimum-enclosure-volume-model determination unit 18B then removes, from the options, a model candidate having a modeling excess amount larger than the permissible modeling excess amount 113 from among the M×Nmax model candidates. If all the model candidates have been removed, the minimum-enclosure-volume-model determination unit 18B causes a display device (not illustrated) to display an error or the like.

Thereafter, the minimum-enclosure-volume-model determination unit 18B selects a model candidate having the smallest modeling excess amount 104 from the model candidates according to the process similar to that of the first embodiment and stores the selected model candidate in the set-model storage unit 19 as the minimum enclosure-volume model 109.

According to the first embodiment, when the hand device 6 or the like is to be modeled, the permissible modeling number (the model upper-limit number 102) is set to determine how much detailed modeling is performed on each hand device 6. According to the present embodiment, the permissible modeling excess amount 113 is set as a limit value to the modeling excess amount 104, thereby determining how much detailed modeling is performed on each hand device 6.

According to the second embodiment, the maximum model upper-limit number 102 is set by using the computation processing time 106 and the model-unit computation amount 108, and a model candidate is selected on the basis of the permissible modeling excess amount 113. The model candidate is set on the basis that all the models are applied as the modeling target, and a model candidate having the smallest modeling excess amount 104 is selected. Accordingly, resources remaining in the robot controller 2 can be utilized to the utmost extent with respect to the model, and modeling with the smallest enclosure volume can be realized.

Third Embodiment.

A third embodiment of the present invention is described with reference to FIG. 11 to FIG. 13. In the third embodiment, a cuboid generation unit (a part of the modeling unit 14) used by the user when performing the modeling process is automated by using three-dimensional CAD (Computer Aided Design) information.

Figure 11:
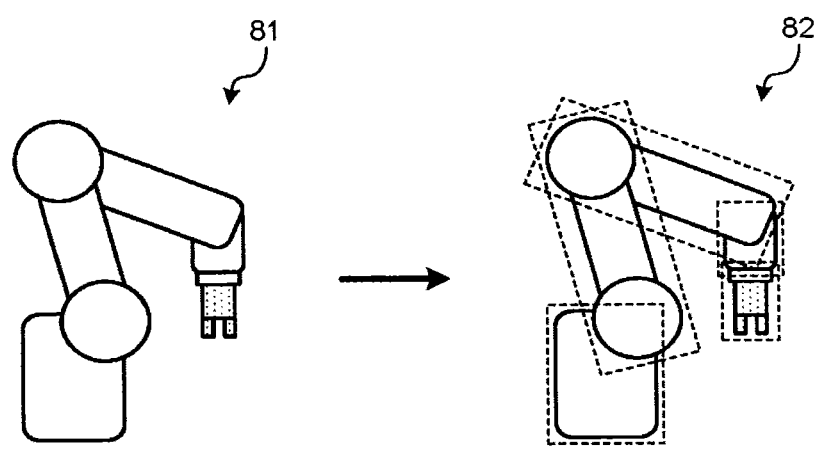
FIG. 11 is an explanatory diagram of a division process for each assembly using a CAD/CAM system.

FIG. 11 is an explanatory diagram of a division process for each assembly (block) using a CAD/CAM system. The modeling unit 14 according to the present embodiment includes a CAD/CAM (CAD/CAE) system. The modeling unit 14 divides a three-dimensional model created in advance into a plurality of assemblies and automatically converts each assembly into a cuboid model. In FIG. 11, a three-dimensional model before conversion (a modeling target) is represented by a three-dimensional model 71, and the three-dimensional model after conversion to a cuboid model for each assembly is represented by a three-dimensional model 72.

Figure 12:
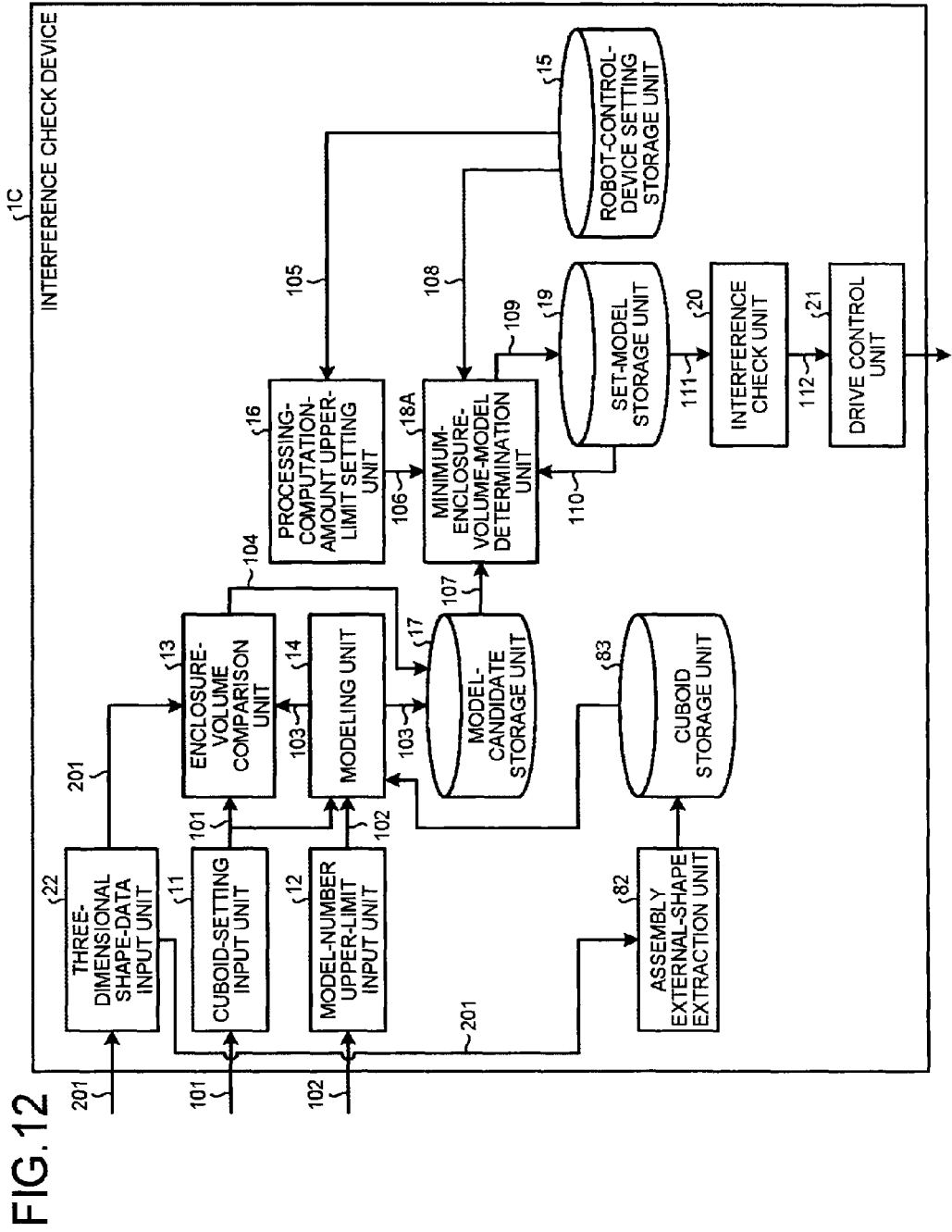
FIG. 12 is a block diagram illustrating a configuration of an interference check device according to a third embodiment.

FIG. 12 is a block diagram illustrating a configuration of an interference check device according to the third embodiment. The configuration of an interference check device 1C as an example of the interference check device 1X is described here. Among the constituent elements illustrated in FIG. 12, constituent elements achieving identical functions as those of the interference check device 1A according to the first embodiment illustrated in FIG. 2 are denoted by like reference signs and redundant explanations thereof are omitted.

The interference check device 1C includes an assembly external-shape extraction unit (conversion unit) 82 and a cuboid storage unit 83, in addition to the respective constituent elements of the interference check device 1A. The interference check device 1C can have a configuration including the assembly external-shape extraction unit 82 and the cuboid storage unit 83 in addition to the respective constituent elements of the interference check device 1B.

A three-dimensional shape-data input unit 22 is an interface to which three-dimensional shape data 201 on a modeling target is input. The three-dimensional shape-data input unit 22 transmits the three-dimensional shape data 201 as a modeling target to the assembly external-shape extraction unit 82. The assembly external-shape extraction unit 82 divides a modeling target into a plurality of assemblies by using cuboids having various sizes and extracts an external shape of each assembly after the division. The assembly external-shape extraction unit 82 stores therein the external shape (a cuboid) of each assembly in the cuboid storage unit 83. The cuboid storage unit 83 is a memory or the like that stores therein the external shape (a cuboid) of each assembly. The modeling unit 14 according to the present embodiment uses the external shape of each assembly stored in the cuboid storage unit 83 to perform modeling on the modeling target.

When a volume Vcad of the modeling target can be acquired, the interference check device 1C can calculate the excess-enclosure volume ratio Wst by using the volume Vcad. For example, when the three-dimensional shape data 201 is input to the three-dimensional shape-data input unit 22, the three-dimensional shape-data input unit 22 inputs the three-dimensional shape data 201 to the enclosure-volume comparison unit 13. When the excess-enclosure volume ratio is calculated, the enclosure-volume comparison unit 13 uses the volume Vcad that is held by the three-dimensional shape data 201 or that can be calculated on the basis of the three-dimensional shape data 201, instead of the volume Vblock of the cuboid defined by the user, to calculate the excess-enclosure volume ratio Wst. Vwst is expressed by the following formula (13). Therefore, the enclosure-volume comparison unit 13 calculates the excess-enclosure volume ratio Wst by using formula (13).

$$Vwst = Vmdl - Vovrp - Vcad \qquad (13)$$

In other words, when the volume Vcad of the three-dimensional shape data 201 can be acquired, the enclosure-volume comparison unit 13 can calculate the excess-enclosure volume ratio Wst by (excess volume)=(total volume modeled by sphere/cylinder on the basis of cuboid defined by user)−(volume of overlapping portion of volume modeled by sphere/cylinder)−(volume calculated by three-dimensional CAD).

In this manner, when the volume Vcad of the three-dimensional shape data 201 is input from the three-dimensional shape-data input unit 22, the interference check device 1C may not include the assembly external-shape extraction unit 82 and the cuboid storage unit 83. When the three-dimensional shape data 201 from the three-dimensional shape-data input unit 22 can be used, the definition expressed by formula (12) can be switched to the definition expressed by formula (13). Further, the interference check devices 1A and 1B can be configured to include the three-dimensional shape-data input unit 22.

The hardware configuration of the interference check devices 1A to 1C is described next. Because the interference check devices 1A to 1C have an identical configuration to one another, only the configuration of the interference check device 1A is described here.

Figure 13:
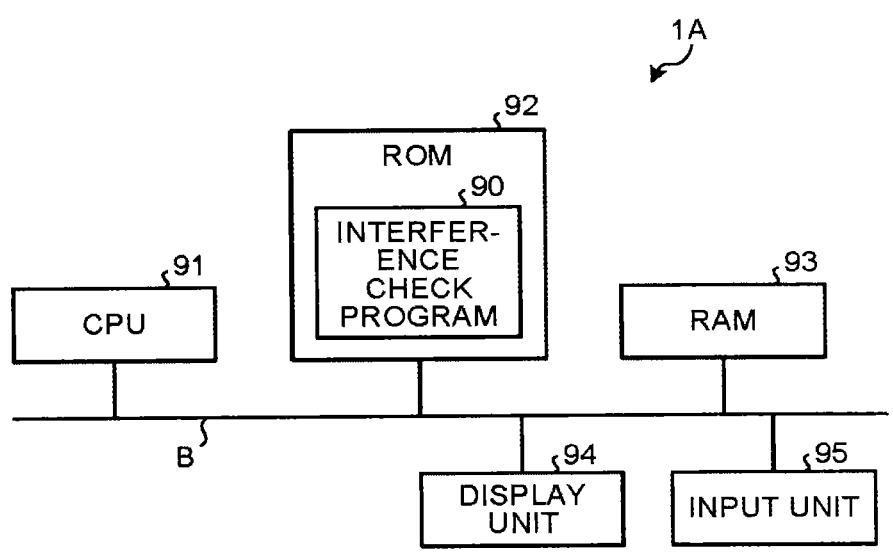
FIG. 13 is a diagram illustrating a hardware configuration of an interference check device.

FIG. 13 is a diagram illustrating the hardware configuration of the interference check device. The interference check device 1A includes a CPU (Central Processing Unit) 91, a ROM (Read Only Memory) 92, a RAM (Random Access Memory) 93, a display unit 94, and an input unit 95. In the interference check device 1A, the CPU 91, the ROM 92, the RAM 93, the display unit 94, and the input unit 95 are connected to each other via a bus line B.

The CPU 91 executes an interference check by using an interference check program 90 that is a computer program. The display unit 94 is a display device such as a liquid crystal monitor and displays a modeling target, a model candidate, a model, and the like on the basis of an instruction from the CPU 91. The input unit 95 is configured to include a mouse, a keyboard, and the like, and receives instruction information (parameters and the like required for an interference check) externally input by the user. The instruction information input to the input unit 95 is sent to the CPU 91.

The interference check program 90 is stored in the ROM 92 and loaded in the RAM 93 via the bus line B. The CPU 91 executes the interference check program 90 loaded in the RAM 93. Specifically, in the interference check device 1A, the CPU 91 reads the interference check program 90 from the ROM 92 according to an instruction input from the input unit 95 by the user, loads the interference check program 90 in a program storage area in the RAM 93 to execute various processes. The CPU 91 temporarily stores various types of data generated in the various processes in the data storage area formed in the RAM 93.

The interference check program 90 executed by the interference check device 1A has a module configuration including the enclosure-volume comparison unit 13, the modeling unit 14, the processing-computation-amount upper-limit setting unit 16, the minimum-enclosure-volume-model determination unit 1BA, the interference check unit 20, and the drive control unit 21, and these units are loaded on a main storage device so as to generate these units on the main storage device.

According to the third embodiment, the robot controller 2 can perform an interference check easily by using models in number equal to or less than the permissible number of models, without requiring the user to check the model size and while suppressing the size of the model volume.

Fourth Embodiment.

A fourth embodiment of the present invention is described with reference to FIG. 14. In the fourth embodiment, after the model upper-limit number 102 is calculated in advance by an external device of an interference check device, the model upper-limit number 102 is input to the interference check device. That is, the user does not input the model upper-limit number 102 from the model-number upper-limit input unit 12 illustrated in FIG. 2, but the model upper-limit number 102 calculated by the external device is input to the interference check device.

The external device that calculates the model upper-limit number 102 is, for example, a device other than the interference check device in the robot controller 2, a control device in a PLC that can communicate with the robot controller 2, or the computer 9. The computer 9 calculates the model upper-limit number 102, for example, by using robot setting software. The case described below is where an external device that calculates the model upper-limit number 102 is the computer 9.

Figure 14:
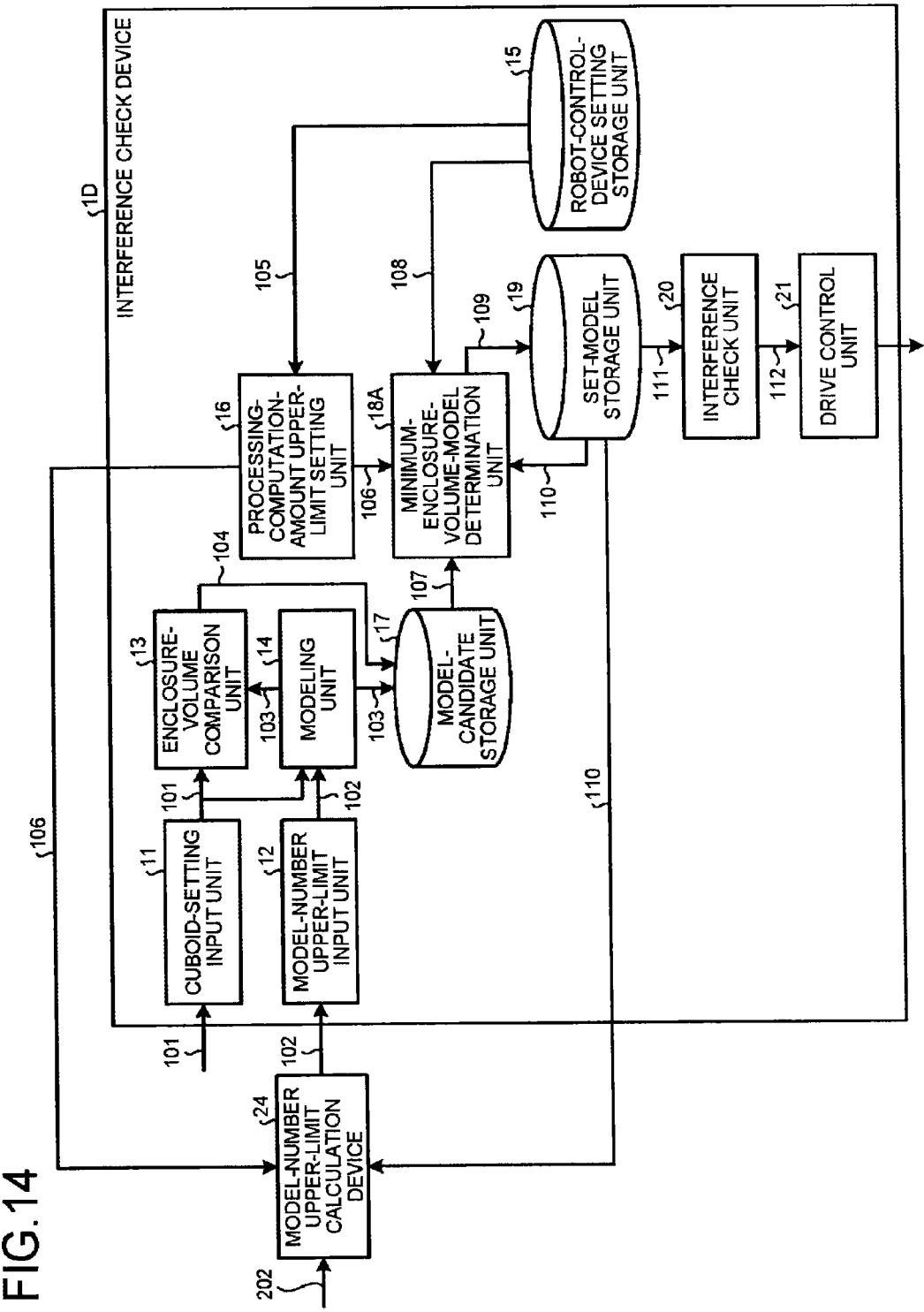
FIG. 14 is a block diagram illustrating a configuration of an interference check device according to a fourth embodiment.

FIG. 14 is a block diagram illustrating a configuration of an interference check device according to the fourth embodiment. The configuration of an interference check device 11D as an example of the interference check device 1X is described here. Among the constituent elements illustrated in FIG. 14, constituent elements achieving identical functions as those of the interference check device 1A according to the first embodiment illustrated in FIG. 2 are denoted by like reference signs and redundant explanations thereof are omitted.

The interference check system 100A according to the present embodiment includes a model-number upper-limit calculation device 24. The model-number upper-limit calculation device 24 can be provided in the interference check system 100B.

An object number 202 when one device unit such as a hand to be arranged as an interference check target or a peripheral device is assumed to be an object is input to the model-number upper-limit calculation device 24 by the user. The model-number upper-limit calculation device 24 is provided in the previous stage of the model-number upper-limit input unit 12 as illustrated in FIG. 14. The model-number upper-limit calculation device 24 calculates the model upper-limit number 102 on the basis of the object number 202.

In the present embodiment, it is assumed that an object is defined by one cuboid and the defined cuboid is counted as one object. For example, when one cuboid is defined with respect to one hand, the number of objects of one hand is one. Further, when a cuboid is applied to each of three portions in total, i.e., two hands and one vision sensor, the number of objects is three.

The user inputs, as object information, the object number 202 of all the devices to be arranged and the name of each object in advance to the model-number upper-limit calculation device 24. That is, each piece of object information includes the total number of objects and the number of models allocated to the object as accompanying information on the object.

The model-number upper-limit calculation device 24 automatically calculates the model upper-limit number 102 that can be used for enclosing a cuboid, defined by the setting input to the cuboid-setting input unit 11. The model-number upper-limit calculation device 24 performs calculation of the number of models (the model upper-limit number 102) by subtracting the number of models to be allocated to each object from the total number of models. This process is automatically performed by the robot controller 2, a control device such as the PLC described above, or the computer 9.

The model upper-limit number 102 is the upper limit of models enclosing a cuboid input to the cuboid-setting input unit 11 this time. The model upper-limit number 102 is determined, for example, as described below.

The model-number upper-limit calculation device 24 performs computation such that at least one model is allocated to each object. Therefore, an initial value is in a state with one model being allocated to one object. When one or more models have been already allocated to a plurality of objects among all the objects, this information is acquired in advance from the set-model storage unit 19.

The model-number upper-limit calculation device 24 acquires the computation upper limit amount 106 from the processing-computation-amount upper-limit setting unit 16 in advance, to calculate the permissible upper limit of the number of models on the basis of the computation upper limit amount 106. The model-number upper-limit calculation device 24 subtracts the sum of the number of models allocated to the objects from the permissible upper limit of the number of models, to determine the model upper-limit number 102 that can be applied this time from the subtracted value.

However, the model upper-limit number 102 is associated with the upper limit of the processing computation amount. Therefore, when the upper limit of the number of objects once set by the user is changed (increased or decreased) after setting the number of objects, the number of models that can be allocated to each object varies. Therefore, the model allocation of the minimum enclosure volume may not satisfy the upper limit of the processing computation amount. Accordingly, a process of changing the model upper-limit number 102 is required with respect to the object that has already been modeled.

Therefore, when the number of objects has been changed, the model setting calculation is performed again by robot setting software or the like on the computer 9. Accordingly, the model-number upper-limit calculation device 24 resets the model upper-limit number 102 of each object such that the total enclosure volume becomes a minimum.

The model upper-limit number 102 is determined by the model-number upper-limit calculation device 24 in the framework described above. However, another external device or the like in the robot controller 2 can specify the model upper-limit number 102 in advance as an initial value. In other words, even if the user does not specify the number of objects, the number of objects assumed by the manufacturer can be set as a preset value (an initial value). For example, the number of objects is set as one in advance. The model upper-limit number 102 itself can be specified in advance by another external device in the robot controller 2. In this case, the number of models is set, for example, to 20 in advance.

The object number 202 illustrated in FIG. 14 can be automatically determined when it is imported to 3D-CAD. In this case, for example, the object is regarded as one cuboid per assembly, and the number of objects is automatically counted.

According to the fourth embodiment, the model-number upper-limit calculation device 24 is used to set the maximum model upper-limit number 102, and a model candidate is selected on the basis of the model upper-limit number 102. The model candidate is set on the basis that all the models that can be used within the model upper-limit number are applied to the modeling target, and a model candidate having the smallest modeling excess amount 104 is selected.

Accordingly, resources remaining in the robot controller 2 can be utilized to the utmost extent with respect to the model, and modeling with the smallest enclosure volume can be realized. Particularly, as compared to the first embodiment, the model upper-limit number 102 is not individually set, but the total number of objects is input in advance. Therefore, the configuration having the smallest total amount of the modeling excess amount 104 with respect to the current entire modeling target can be set, while taking all the objects into consideration.

INDUSTRIAL APPLICABILITY

As described above, the interference check device according to the present invention is appropriate for an interference check between robots or between a robot and peripheral devices.

REFERENCE SIGNS LIST 1X, 1A to 1D interference check device, 2 robot controller, 5 peripheral device, 6 hand device, 7 vision sensor, 9 computer, 10 robot, 11 cuboid-setting input unit, 12 model-number upper-limit input unit, 13 enclosure-volume comparison unit, 14 modeling unit, 15 robot-control-device setting storage unit, 16 processing-computation-amount upper-limit setting unit, 17 model-candidate storage unit, 18A, 18B minimum-enclosure-volume-model determination unit, 19 set-model storage unit, 20 interference check unit, 21 drive control unit, 22 three-dimensional shape-data input unit, 23 permissible modeling-excess-amount input unit, 24 model-number upper-limit calculation device, 82 assembly external-shape extraction unit, 83 cuboid storage unit, 100A, 100B interference check system.

The invention claimed is:
1. An interference check device comprising:
a model-number upper-limit input circuit to which an upper limit number of geometric models that is allocated to a modeling target is input, the modeling target being a target of an interference check;
a modeling process circuit that, when a cuboid that is capable of enclosing the modeling target is set as the modeling target as a model for an interference check, uses new geometric models that have a calculation cost per unit distance calculation smaller than the cuboid and that are in number equal to or less than the upper limit number of the geometric models to replace the cuboid with the new geometric models and models the modeling target;
a model-candidate storage memory that stores, as model candidates, models in Which the new geometric models are used;
a computation-amount upper-limit setting process circuit that sets a computation upper-limit amount that is an upper limit of a computation processing amount in calculation processing of the interference check, on a basis of information relating to the computation processing amount required for each process performed by a controller that controls the modeling target;
a volume-model determination process circuit that extracts, from the model candidates, a model candidate on which a calculation processing of the interference check is capable of being performed with the computation processing amount equal to or less than the upper-limit amount, and determines the model candi- date having a smallest model enclosure volume as the model for the modeling target from among extracted model candidates; and an interference check process circuit that performs to the interference check between models by using the model determined by the volume-model determination process circuit, and, if there is a possibility of interference, outputs an operation stop command, and, if there is no possibility of interference, outputs an operation continuation command.

2. An interference check device for checking interface between robots or between a robot and peripheral devices, comprising:

a limit-value input circuit to which a volume upper limit of a volume permitted for a model that is allocated to a modeling target of at least one component of the robot with respect to a volume of the modeling target is input, the modeling target being a target of an interference desk;

a computation-amount upper-limit setting process circuit that sets a computation upper-limit amount that is an upper-limit of a computation processing amount in calculation processing of to the interference check, on a basis of information relating to the computation processing amount required for each process performed by a controller that controls the modeling target;

a model-number calculation process circuit that calculates an upper-limit number of models that is an upper limit number of geometric models processable by the controller, on a basis of the computation upper-limit amount;

a modeling process circuit that, when a cuboid that is capable of enclosing the modeling target is set as the modeling target as a model for the interference check, uses new geometric models associated with the at least one component of the robot that have a calculation cost per unit distance calculation smaller than the cuboid and that are in number equal to or less than the upper limit number of models to replace the cuboid with the new geometric models and models the modeling target of the at least one component of the robot;

a model-candidate storage memory that stores, as model candidates, models in which the new geometric models are used;

a volume-model determination process circuit that extracts, from the model candidates, a model candidate on which a calculation processing of the interference check is capable of being performed with the computation processing amount equal to or less than the upper-limit amount, and, if there is a model having a volume equal to or less than the volume upper limit among extracted model candidates, determines the model candidate having a smallest model enclosure volume as the model for the modeling target from among extracted model candidates; and an interference check process circuit that performs to the interference check between models by using the model determined by the volume-model determination process circuit, and, if there is a possibility of interference, outputs an operation stop command to the robot or a command correcting a motion trajectory of the robot, and, if there is no possibility of interference, outputs an operation continuation command to the robot.

3. The interference check device according to claim 1, further comprising a cuboid-setting input circuit to which information relating to a size of the cuboid that is capable of enclosing the modeling target is input, wherein the modeling process circuit replaces the cuboid with the new geometric model on a basis of the information relating to the size of the cuboid.

4. The interference check device according to claim 1, wherein the volume-model determination process circuit extracts a model candidate on which the calculation processing of the interference check is capable of being performed with the computation processing amount equal to or less than the upper-limit amount on a basis of information relating to the computation amount in calculation processing for each model required for the interference check by the controller, and determines the model candidate having a smallest model enclosure volume as the model for the modeling target from among extracted model candidates.

5. The interference check device according to claim 1, further comprising a conversion process circuit that, when a three-dimensional model as a modeling target created in advance by using a computer aided design/computer aided machine (CAD/CAM) system is input, divides the three-dimensional model into a plurality of assemblies by using the CAD/CAM system and converts the three-dimensional model to a cuboid model for each assembly, wherein the modeling process circuit models the modeling target by using the three-dimensional model converted to the cuboid model for each assembly.

6. The interference check device according to claim 1, wherein the new geometric model is any of a combination of spherical models, a combination of cylindrical models, and a combination of a spherical model and a cylindrical model.

7. The interference check device according to claim 2, further comprising a cuboid-setting input circuit to which information relating to a size of the cuboid that is capable of enclosing the modeling target is input, wherein the modeling process circuit replaces the cuboid with the new geometric model on a basis of the information relating to the size of the cuboid.

8. The interference check device according to claim 2, wherein the volume-model determination process circuit extracts the model candidate on which the calculation processing of the interference check is capable of being performed with the computation processing amount equal to or less than the upper-limit amount on a basis of information relating to the computation amount in calculation processing for each model required for the interference check by the controller, and determines the model candidate having a smallest model enclosure volume as the model for the modeling target from among extracted model candidates.

9. The interference check device according to claim 2, further comprising a conversion process circuit that, when a three-dimensional model as a modeling target created in advance by using a computer aided design/computer aided machine (CAD/CAM) system is input, divides the three-dimensional model into a plurality of assemblies by using the CAD/CAM system and converts the three-dimensional model to a cuboid model for each assembly, wherein the modeling process circuit models the modeling target by using the three-dimensional Model converted to the cuboid model for each assembly.

10. The interference check device according to claim 2, wherein the new geometric model is any of a combination of spherical models, a combination of cylindrical models, and a combination of a spherical model and a cylindrical model.

* * * * *